(12) United States Patent
Fujimoto et al.

(10) Patent No.: US 8,484,266 B2
(45) Date of Patent: Jul. 9, 2013

(54) EMBEDDED CONTROL SYSTEM WITH FLOATING-POINT CONVERSION

(75) Inventors: Shinya Fujimoto, Hitachinaka (JP);
Keiichiro Ohkawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1175 days.

(21) Appl. No.: 12/389,161

(22) Filed: Feb. 19, 2009

(65) Prior Publication Data
US 2009/0249040 A1    Oct. 1, 2009

(30) Foreign Application Priority Data

Mar. 31, 2008 (JP) ................. 2008-091632

(51) Int. Cl.
*G06J 1/00* (2006.01)
*G06F 17/15* (2006.01)
*G06F 7/00* (2006.01)
*G06F 7/38* (2006.01)

(52) U.S. Cl.
USPC ............. 708/204; 708/3; 708/5; 708/290; 708/513; 712/222

(58) Field of Classification Search
USPC .. 708/3, 5, 204, 495, 503, 513, 290; 712/222; 713/193; 701/29, 33, 93
See application file for complete search history.

(56) References Cited

U.S. PATENT DOCUMENTS

| | | | | |
|---|---|---|---|---|
| 6,105,129 A * | 8/2000 | Meier et al. | ............... | 712/222 |
| 6,212,539 B1 * | 4/2001 | Huck et al. | ............... | 708/495 |
| 6,253,312 B1 * | 6/2001 | Elliott et al. | ............... | 712/222 |
| 6,487,653 B1 * | 11/2002 | Oberman et al. | ............. | 712/222 |
| 6,601,079 B1 * | 7/2003 | Phillips | ......................... | 708/495 |
| 7,188,133 B2 * | 3/2007 | Miyasaka et al. | ............. | 708/503 |

(Continued)

FOREIGN PATENT DOCUMENTS

| | | |
|---|---|---|
| EP | 0 182 963 A2 | 6/1986 |
| EP | 0 782 319 A2 | 7/1997 |

(Continued)

OTHER PUBLICATIONS

Japanese Office Action dated Jun. 8, 2010 (Three (3) pages).
Partial European Search Report dated Jun. 30, 2010 (seven (7) pages).

*Primary Examiner* — Idriss N Alrobaye
*Assistant Examiner* — Henry Yu
(74) *Attorney, Agent, or Firm* — Crowell & Moring LLP (57) ABSTRACT

An embedded control system capable of ensuring precision in arithmetic with data in the floating-point format and also avoiding a shortage of the storage area of a memory is provided.

According to an embedded control system in the present invention, when discrete data in the floating-point format is stored in a read-only memory, the discrete data in the floating-point format is converted into data in a significand-reduced floating-point format before being stored. Here, a significand-reduced floating-point number is a number obtained by deleting low-order bits of the significand of a floating-point number. Further, an interpolation search is performed using discrete data, the discrete data in the significand-reduced floating-point format stored in the read-only memory is brought back to the discrete data in the floating-point format before an interpolation search being performed.

11 Claims, 12 Drawing Sheets

U.S. PATENT DOCUMENTS

| | | | |
|---|---|---|---|
| 7,236,995 B2 * | 6/2007 | Hinds | 708/204 |
| 7,797,360 B2 * | 9/2010 | Kretzschmar et al. | 708/204 |
| 2002/0184282 A1 * | 12/2002 | Yuval et al. | 708/495 |
| 2003/0188182 A1 * | 10/2003 | Sato et al. | 713/193 |
| 2004/0205096 A1 * | 10/2004 | Hansen et al. | 708/513 |
| 2005/0038581 A1 * | 2/2005 | Kapolka et al. | 701/29 |
| 2005/0240333 A1 * | 10/2005 | Bauerle et al. | 701/93 |
| 2006/0259745 A1 | 11/2006 | Dhong et al. | |
| 2007/0245834 A1 * | 10/2007 | Goldfine et al. | 73/862.338 |
| 2008/0104576 A1 * | 5/2008 | Kaksonen | 717/124 |
| 2008/0288135 A1 * | 11/2008 | Katrak et al. | 701/33 |

FOREIGN PATENT DOCUMENTS

| | | |
|---|---|---|
| EP | 1 441 277 A2 | 7/2004 |
| JP | 2000-182072 A | 6/2000 |
| JP | 2004-225668 A | 8/2004 |

* cited by examiner

EMBEDDED CONTROL SYSTEM WITH FLOATING-POINT CONVERSION

BACKGROUND OF THE INVENTION

1. Field of the Invention

The present invention relates to a control system generating a control signal to a device to be controlled, and in particular, relates to an embedded control system provided with a processor for performing floating-point operations.

2. Description of the Related Art

In recent years, with emissions/fuel efficiency regulations tightened, demanded driving stability/safety levels are increasing. Thus, improved control accuracy is also demanded of embedded control systems of automobiles and adoption of a control unit provided with a processor (FPU) or microcomputer to perform floating-point operations has begun.

In an embedded control system of an automobile, an interpolation search of a table/map is performed from map/table/axis data. The map/table/axis data means map/axis data or table/axis data. The map/axis data is a three-dimensional map with a parameter called the axis set as the X axis and controlled amounts each set as the Y axis and the Z axis. The table/axis data is a two-dimensional table with a parameter called the axis set as the X axis and a controlled amount as the Y axis.

Such data takes discrete values, which are also called reference values. Thus, processing to obtain data with higher precision from such discrete value data is an interpolation search. Data obtained from an interpolation search is used to control a control target.

Map/table/axis data is represented as fixed-point numbers. However, when a floating-point operation processor (FPU) or microcomputer is used, map/table/axis data needs to be represented as floating-point numbers.

The data size of a fixed-point number is 1 byte, 2 bytes, or 4 bytes. The data size of a floating-point number, on the other hand, is 4 bytes for single-precision floating-point number and 8 bytes for a double-precision floating-point number. Thus, the amount of data used for floating-point operations will be approximately double compared with that used for conventional fixed-point operations and the storage area of a processor (FPU) or microcomputer is starting to run short.

When map/table/axis data is stored in a memory using a technology disclosed by Japanese Patent Application Laid-Open No. 2004-225668, the data is defined by fixed-point numbers requiring a smaller data capacity. When an interpolation search of the table/map from map/table/axis data is performed, data in the fixed-point format is converted into data in the floating-point format. Thus, a shortage of storage capacity in the memory can be avoided while at the same time, arithmetic precision is ensured.

When map/table/axis data is converted by conventional technology, physical value conversion data (LSB data and offset data) is used. That is, when an interpolation search is performed, fixed-point map/table/axis data is converted into floating-point format data and multiplied by LSB data, which is physical value conversion data, before offset data being further added thereto. When map/table/axis data is stored in a backup memory, floating-point map/table/axis data is temporarily fetched from a random access memory. Next, the data is limited by a fixed-point maximum value and minimum value. Then, the offset data is subtracted from the data and the resultant data is divided by the LSB data. The map/table/axis data obtained in this way is stored in the backup memory. Thus, there is a possibility that computational load increases.

The present invention has been developed in view of the above subject and an object thereof is to provide an embedded control system capable of ensuring precision in arithmetic with data in the floating-point format and also avoiding a shortage of storage area in a memory.

SUMMARY OF THE INVENTION

According to an embedded control system in the present embodiment, when discrete data in the floating-point format is stored in a read-only memory, the discrete data in the floating-point format is converted into discrete data in the significand-reduced floating-point format before being stored. Here, a significand-reduced floating-point number is a number obtained by deleting low-order bits of the significand of the floating-point number.

Further, when an interpolation search is performed from discrete data, the interpolation search is performed after discrete data in the significand-reduced floating-point format being brought back to discrete data in the floating-point format.

According to the present invention, an embedded control system capable of ensuring precision in arithmetic with data in the floating-point format and also avoiding a shortage of storage area in the memory is provided.

DESCRIPTION OF REFERENCE NUMERALS

1: Control unit (C/U); 2: Central processing unit (CPU); 3: Read-only memory (ROM); 4: Control target device; 5: Sensor; 6: Actuator; 7: Input/output unit (I/O); 24: Backup memory; 26: Random access memory (RAM)

DESCRIPTION OF THE PREFERRED EMBODIMENT

Embodiments of the present invention will be described below. Examples of the present invention will be described using drawings. A first example of an embedded control system of the present invention will be described with reference to FIG. 1. The embedded control system in the example has a control unit (C/U) 1 provided with a microcomputer. The control unit (C/U) 1 has a central processing unit (CPU) 2, a read-only memory (ROM) 3, a memory (RAM), and an input/output unit (I/O) 7. Map/table/axis data 8 is stored in the read-only memory 3.

Figure 1:
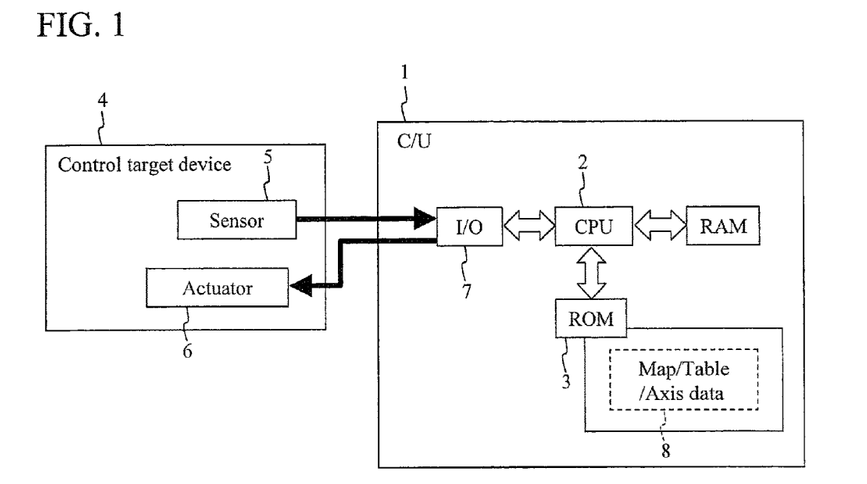
FIG. 1 is a block diagram showing the configuration of a first example of an embedded control system according to the present invention.

A control target device 4 has a sensor 5 and an actuator 6. A signal from the sensor 5 provided in the control target device 4 is sent to the control unit 1. The signal from the sensor 5 is sent to the central processing unit 2 via the input/output unit 7 of the control unit 1. The central processing unit 2 performs an interpolation search using the signal from the sensor 5 and the map/table/axis data 8 stored in the read-only memory 3 to generate a control signal. The control signal is sent to the actuator 6 of the control target device 4 via the input/output unit 7.

The control unit 1 may be an on-board engine control unit, the control target device 4 may be a gasoline-injected internal combustion engine, the sensor 5 may be an intake air amount sensor or an engine speed sensor, and the actuator 6 may be a fuel injection valve. In this case, the map/table/axis data 8 may be a three-dimensional map with the X axis set as an intake air amount axis, the Y axis as an engine speed axis, and the Z axis as a fuel injection amount.

A measured value of the intake air amount is supplied from the intake air amount sensor to the central processing unit 2 and a measured value of the engine speed is supplied from the engine speed sensor to the central processing unit 2. The central processing unit 2 calculates the fuel injection amount by an interpolation search on a fuel injection amount map. That is, the fuel injection amount corresponding to measured values of the intake air amount and engine speed is calculated from discrete values on the fuel injection amount map. Data in the floating-point format is used for an interpolation search in the central processing unit 2.

Based on the fuel injection amount obtained from the interpolation search, the central processing unit 2 generates a signal for controlling the valve opening time of the fuel injection valve. The signal is supplied to the gasoline-injected internal combustion engine to control fuel injection.

According to the present invention, the control target device 4 may be a gasoline-injected internal combustion engine, but may also be other device, for example, an air conditioner. If the control target device 4 is an air conditioner, the control unit 1 is a controller of the air conditioner. In any case, the present invention is applicable to any embedded control system in which software is installed in hardware in advance.

Figure 2:
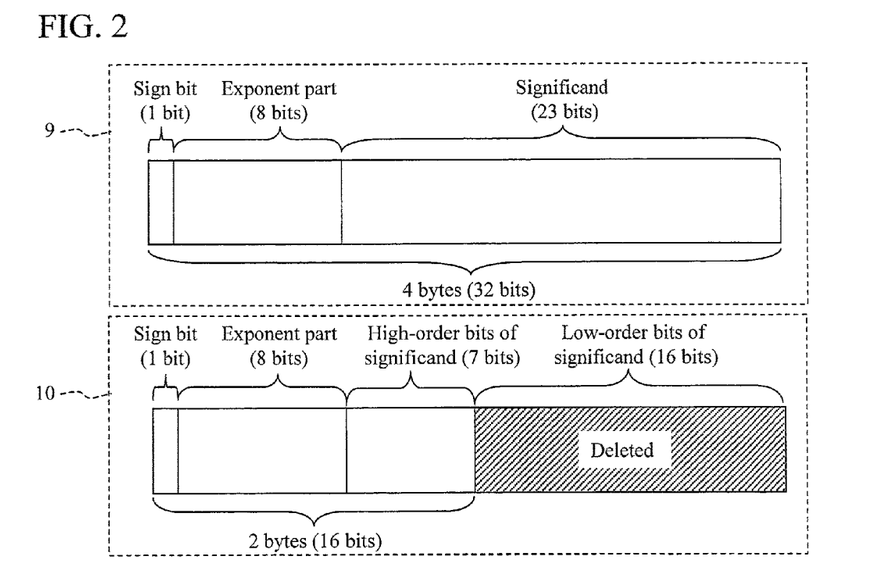
FIG. 2 is a diagram showing data in a conventional floating-point format and data in a significand-reduced floating-point format according to the present invention.

Examples of data in the floating-point format according to conventional technology and data in the significand-reduced floating-point format according to the present invention will be described with reference to FIG. 2. First, data 9 in the floating-point format according to conventional technology will be described. The data 9 in the floating-point format shows data in the floating-point format conforming to the IEEE 754 standard. The data 9 in the floating-point format is data of a total of 4 bytes consisting of the sign bit (1 bit)+the exponent part (8 bits)+the significand (23 bits).

Next, an example of data 10 in the significand-reduced floating-point format defined in the present invention will be described. The data 10 in the significand-reduced floating-point format of the example is data of a total of 2 bytes consisting of the sign bit (1 bit)+the exponent part (8 bits)+the significand (7 bits).

Comparison of the data 10 in the significand-reduced floating-point format of the example with the data 9 in the floating-point format conforming to the IEEE 754 standard shows that low-order bits of the significand are deleted in the data 10 in the significand-reduced floating-point format of the example. Here, a case in which 16 low-order bits of the significand are deleted is shown.

The 2-byte data 10 in the significand-reduced floating-point format defined by the present invention is obtained by deleting 16 low-order bits of the significand from the 4-byte data 9 in the single-precision floating-point format.

Here, an example in which the 2-byte data 10 in the significand-reduced floating-point format is generated using the 4-byte data 9 in the single-precision floating-point format is described, but the present invention is not limited to this. For example, instead of the 4-byte data 9 in the single-precision floating-point format, 8-byte data in the double-precision floating-point format may be used. Also, instead of the 2-byte data 10 in the significand-reduced floating-point format, the data 10 in the significand-reduced floating-point format of bytes other than 2 bytes may be generated. As shown in FIG. 2, a case in which data in the significand-reduced floating-point format is generated using the 4-byte data 9 in the single-precision floating-point format will be described below.

Figure 3:
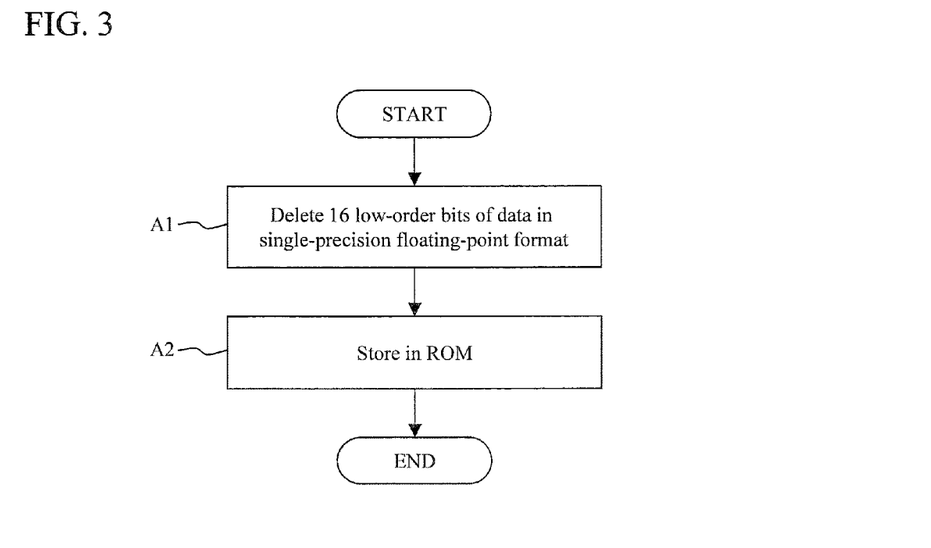
FIG. 3 is a diagram of flowchart illustrating processing for generating data in the significand-reduced floating-point format from data in the floating-point format and for storing the data in a memory in the embedded control system according to the present invention.

Processing for changing the data 9 in the single-precision floating-point format to the data 10 in the significand-reduced floating-point format and for storing the data 10 in a memory will be described with reference to FIG. 3. This processing is performed by the central processing unit (CPU) 2. 16 low-order bits of the data 9 in the single-precision floating-point format are deleted at step A1. The data 10 in the significand-reduced floating-point format is thereby generated. The map/table/axis data 8 defined by the data 10 in the significand-reduced floating-point format is stored in the read-only memory 3 at step A2.

Since the 2-byte data 10 in the significand-reduced floating-point format is used in the example, the data amount is reduced by 50% when compared with a case in which the 4-byte data 9 in the single-precision floating-point format is used. It is assumed, for example, that single-precision floating-point map/table/axis data stored in the read-only memory 3 has a storage capacity of 500 bytes. By using the data 10 in the significand-reduced floating-point format of the example, the storage capacity of 250 bytes can be reduced.

Figure 4:
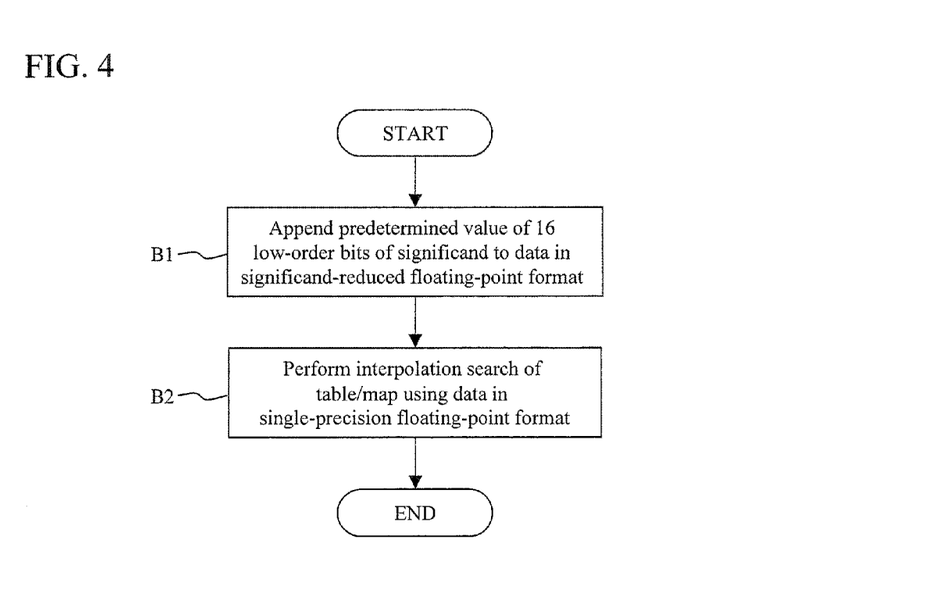
FIG. 4 is a diagram of flowchart illustrating processing for generating data in the significand-reduced floating-point format from data in the floating-point format and for performing an interpolation search of a table/map using the data in the embedded control system according to the present invention.

Processing for bringing back the data 10 in the significand-reduced floating-point format to the data 9 in the single-precision floating-point format and for performing an interpolation search of a table/map will be described with reference to FIG. 4. This processing is performed by the central processing unit (CPU) 2. A predetermined value 12 of 16 low-order bits of the significand is appended to the data 10 in the significand-reduced floating-point format at step B1. The data 10 in the significand-reduced floating-point format is thereby brought back to the data 9 in the single-precision floating-point format. The predetermined value 12 is any predefined constant. The predetermined value 12 may be zero.

An interpolation search of a table/map is performed using data of the data 9 in the single-precision floating-point format at step B2.

Figure 5:
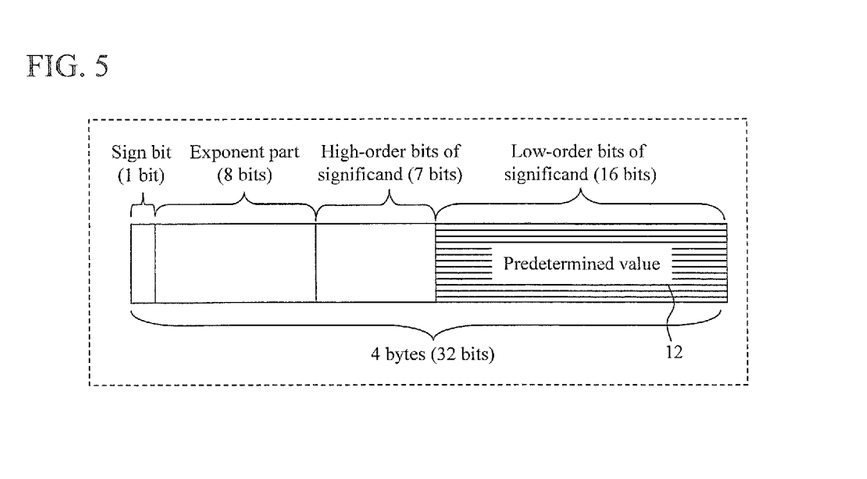
FIG. 5 is a diagram showing data in the floating-point format obtained by substituting a predetermined value into low-order bits of the significand of data in the significand-reduced floating-point format in the embedded control system according to the present invention.

FIG. 5 shows a state in which the data 9 in the single-precision floating-point format is generated by appending the predetermined value 12 of 16 low-order bits of the significand to the data 10 in the significand-reduced floating-point format. A shown in FIG. 5, low-order bits of the significand were deleted when the data 10 in the significand-reduced floating-point format was generated. Therefore, the predetermined value 12 of 16 low-order bits of the significand is appended to generate data of the data 9 in the single-precision floating-point format. The predetermined value 12 will be described later. In this manner, the 2-byte data 10 in the significand-reduced floating-point format is converted into the 4-byte data 9 in the single-precision floating-point format.

Figure 6:
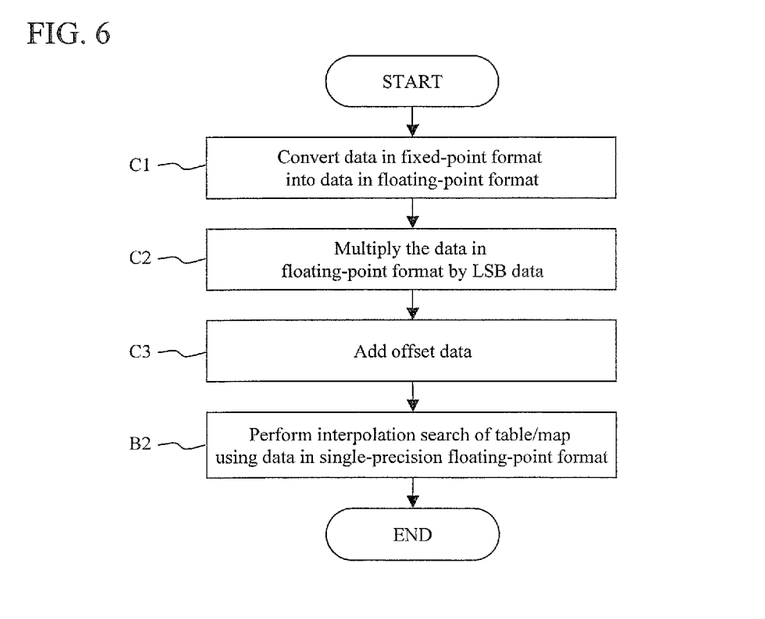
FIG. 6 is a diagram of flowchart illustrating processing for generating data in the floating-point format from data in a fixed-point format and for performing an interpolation search of a table/map using the data by conventional technology.

Processing for performing an interpolation search of a table/map using data in the fixed-point format by conventional technology will be described with reference to FIG. 6. According to conventional technology, the map/table/axis data 8 is defined as data in the fixed-point format and stored in a memory. Therefore, data in the fixed-point format needs to be converted into the data 9 in the single-precision floating-point format in order to perform an interpolation search of the table/map, and physical value conversion data (LSB data and offset data) for the conversion needs to be defined.

Data in the fixed-point format is converted into data in the single-precision floating-point format at step C1. The data in the single-precision floating-point format is multiplied by LSB (least significant bit) data at step C2. Offset data is added to the data in the single-precision floating-point format at step C3. An interpolation search of the table/map is performed using the data 9 in the single-precision floating-point format at step B2.

In the conventional method, as described above, three steps of step C1, step C2, and step C3 are needed before performing an interpolation search of the table/map at step B2. According to the present invention, on the other hand, as shown in FIG. 4, only one step of step B1 is needed before performing an interpolation search of the table/map at step B2. Therefore, it becomes possible to reduce a computational load.

Figure 7:
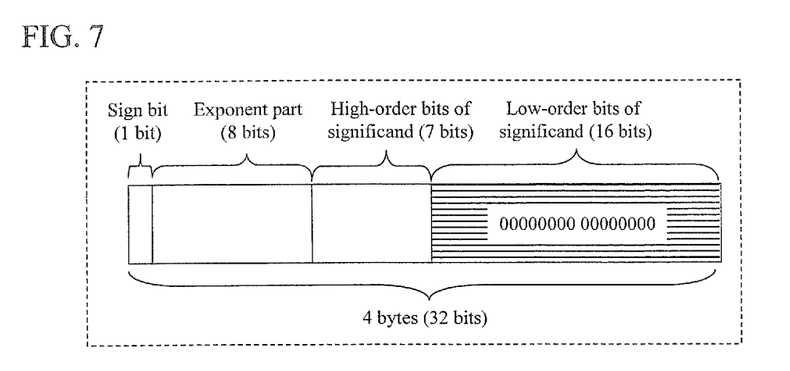
FIG. 7 is a diagram showing data in the floating-point format obtained by substituting 0 into low-order bits of the significand of data in the significand-reduced floating-point format in the embedded control system according to the present invention.

FIG. 7 shows a case in which data 13 in the single-precision floating-point format is obtained by appending 0 as the predetermined value 12 to the data 10 in the significand-reduced floating-point format.

Figure 8:
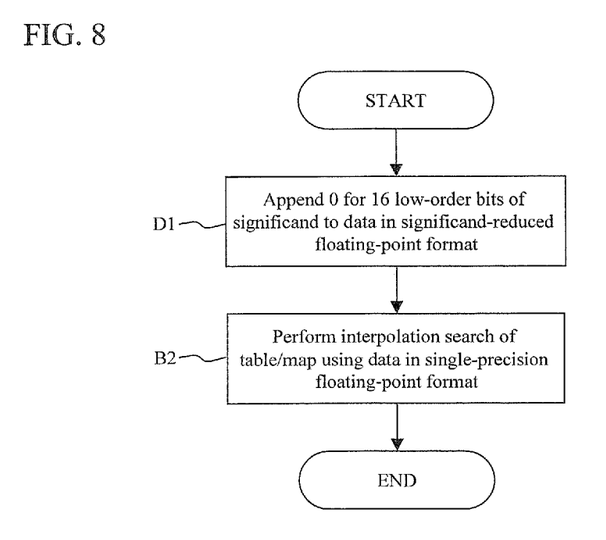
FIG. 8 is a diagram of flowchart illustrating processing for generating data in the floating-point format by substituting 0 into low-order bits of the significand of data in the significand-reduced floating-point format and for performing an interpolation search of a table/map using the data in the embedded control system according to the present invention.

Processing for obtaining the data 13 in the single-precision floating-point format shown in FIG. 7 will be described with reference to FIG. 8. 0 for 16 low-order bits of the significand is appended to the data 10 in the significand-reduced floating-point format at step D1. The data 10 in the significand-reduced floating-point format is thereby converted into the data 9 in the single-precision floating-point format. An interpolation search of the table/map is performed using the data 13 in the single-precision floating-point format at step B2.

Instead of appending 0 of the predetermined value 12, 16 low-order bits of the significand of the data 10 in the significand-reduced floating-point format may be regarded as 0, thereby performing an interpolation search of the table/map. By regarding the predetermined value 12 as 0 in this manner, step D1 can be eliminated. Therefore, a computational load can further be reduced. If 0 is appended as the predetermined value 12, an error contained in the data 9 in the single-precision floating-point format restored thereby may become larger. Thus, by using a value other than 0 as the predetermined value 12, an error contained in the restored data 9 in the single-precision floating-point format can be made smaller.

Figure 9:
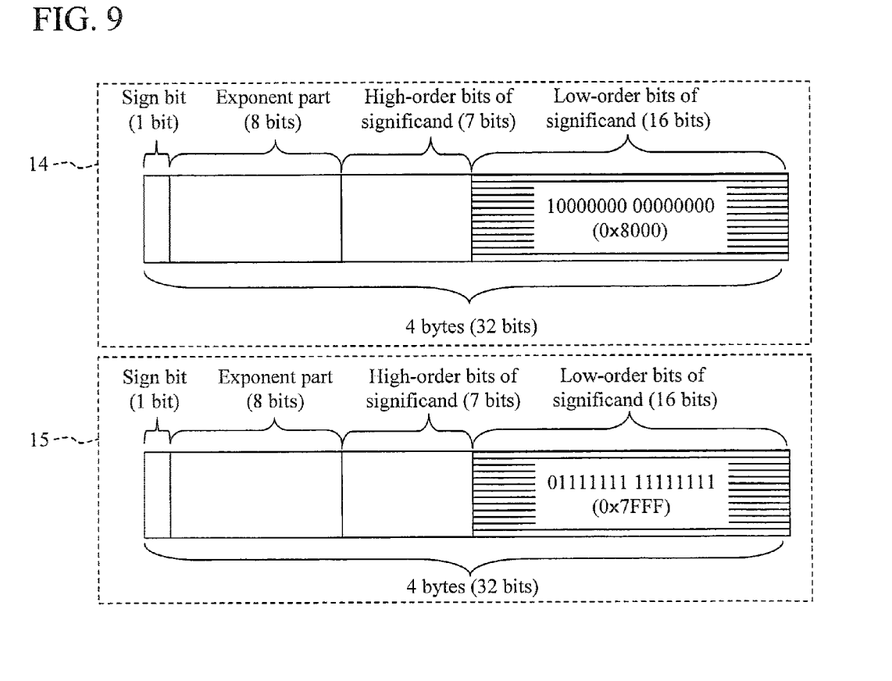
FIG. 9 is a diagram showing an example of data in the significand-reduced floating-point format obtained by substituting a value substantially half the maximum value that can be taken by a predetermined value into low-order bits of the significand of data in the significand-reduced floating-point format in the embedded control system according to the present invention.

An example of the predetermined value 12 being appended to 16 low-order bits of the significand of the data 10 in the significand-reduced floating-point format will be described with reference to FIG. 9. In data 14 and 15 in the significand-reduced floating-point format of the example, it is assumed that the predetermined value 12 is a value corresponding to half the maximum value that can be taken by the predetermined value 12. If, for example, the maximum value that can be taken by the predetermined value 12 is 65535, half the maximum value can be 32767 or 32768. In the data 14 in the significand-reduced floating-point format on the upper side of FIG. 9, the predetermined value 12 is 32767. This number is represented in binary notation as a number of 1 followed by 15 0s and in hexadecimal notation as 0x8000. In the data 15 in the significand-reduced floating-point format on the lower side of FIG. 9, the predetermined value 12 is 32768. This number is represented in binary notation as a number of 0 followed by 15 1s and in hexadecimal notation as 0x7FFF.

Figure 10:
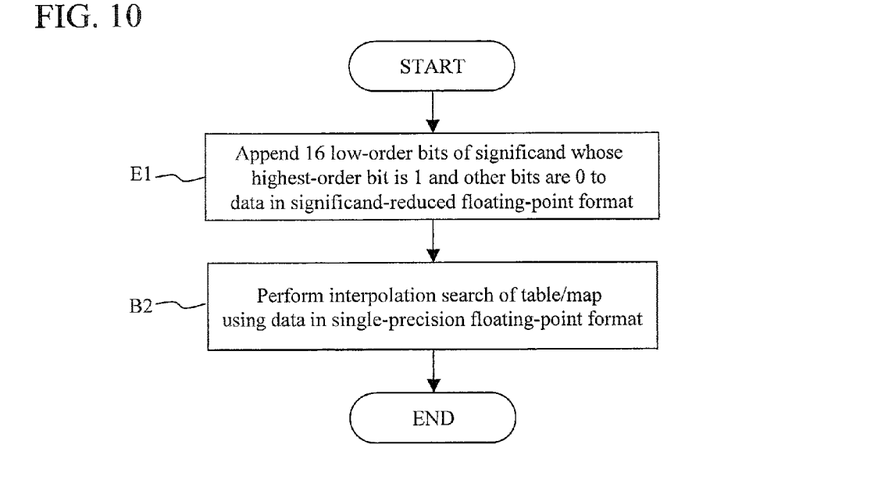
FIG. 10 is a diagram of flowchart illustrating processing for generating data in the significand-reduced floating-point format by substituting a value substantially half the maximum value that can be taken by a predetermined value into low-order bits of the significand of data in the significand-reduced floating-point format and for performing an interpolation search of a table/map using the data in the embedded control system according to the present invention.

First, a description will be provided with reference to FIG. 10. 16 low-order bits of the significand whose highest-order bit is 1 and other bits are 0 are appended to the data 10 in the significand-reduced floating-point format at step E1. The data 10 in the significand-reduced floating-point format is thereby converted into the data 14 in the single-precision floating-point format in FIG. 9. An interpolation search of the table/map is performed using the data 14 in the single-precision floating-point format at step B2.

Figure 11:
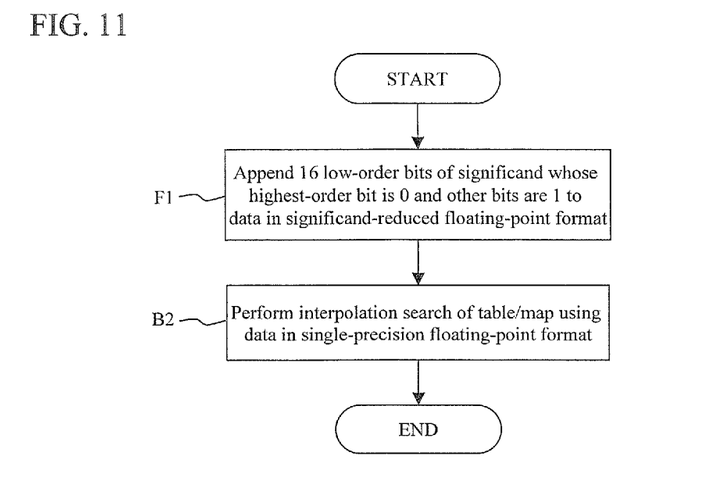
FIG. 11 is a diagram of flowchart for generating data in the significand-reduced floating-point format by substituting a value substantially half the maximum value that can be taken by a predetermined value into low-order bits of the significand of data in the significand-reduced floating-point format and for performing an interpolation search of a table/map using the data in the embedded control system according to the present invention.

Next, a description will be provided with reference to FIG. 11. 16 low-order bits of the significand whose highest-order bit is 0 and other bits are 1 are appended to the data 10 in the significand-reduced floating-point format at step F1. The data 10 in the significand-reduced floating-point format is thereby converted into the data 15 in the single-precision floating-point format in FIG. 9. An interpolation search of the table/map is performed using the data 15 in the single-precision floating-point format at step B2.

If the predetermined value to be appended to 16 low-order bits of the significand of the data 10 in the significand-reduced floating-point format is set to a value about half the maximum value that can be taken by the predetermined value, as described above, an error contained in the restored data 9 in the single-precision floating-point format is made smaller. Therefore, a rounding error that occurs when the data 10 in the significand-reduced floating-point format is stored in the read-only memory 3 can be normalized.

Figure 12:
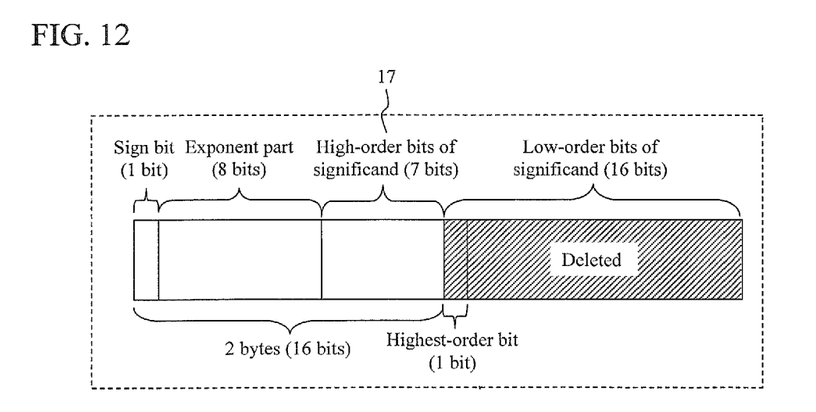
FIG. 12 is a diagram showing another example of data in the significand-reduced floating-point format according to the present invention.

Another example of generating data in the significand-reduced floating-point format will be described with reference to FIG. 12. When data in the significand-reduced floating-point format is generated in the example, 16 low-order bits of the significand are deleted and at this point, the value of a highest-order bit 18 (1 bit) of low-order bits (16 bits) of the significand is used to change the value of high-order bits 17 (7 bits) of the significand. The flowchart at this point is shown in FIG. 13.

Figure 13:
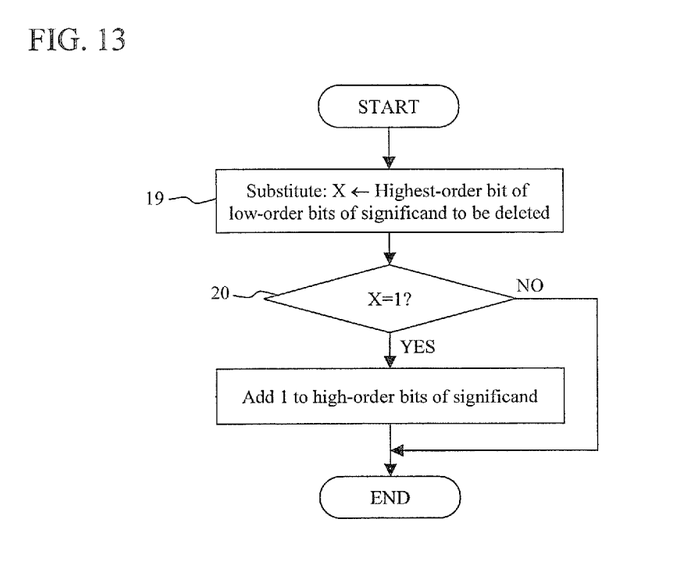
FIG. 13 is a diagram of flowchart illustrating processing for generating data in the significand-reduced floating-point format shown in FIG. 12 in the embedded control system according to the present invention.

A description will be provided with reference to FIG. 13. The bit value of the highest-order bit 18 (1 bit) of low-order bits (16 bits) of the significand of the data 9 in the single-precision floating-point format is set as X at step 19. Next, at step 20, whether or not X is 1 is determined. If X=1, processing proceeds to step 21. At step 21, 1 is added to the high-order bits 17 of the significand.

This is because when X=1, the value of 16 low-order bits of the significand to be deleted is considered to be relatively large. On the other hand, when brought back to the data 9 in the single-precision floating-point format, 0 is appended as the predetermined value 12. At this point, there is a possibility that an error between the restored data 9 in the single-precision floating-point format and the original data 9 in the single-precision floating-point format becomes large. Thus, an error is controlled by adding 1 to the high-order bits of the significand.

If X≠1 (X=0) at step 20, the processing terminates without changing the high-order bits 17 of the significand. When X=0, the value of 16 low-order bits of the significand to be deleted is considered to be relatively small. In this case, when brought back to the data 9 in the single-precision floating-point format, an error between the restored data 9 in the single-precision floating-point format and the original data 9 in the single-precision floating-point format is considered to be small even if 0 is appended as the predetermined value 12. Thus, there is no need to change the high-order bits 17.

Figure 14:
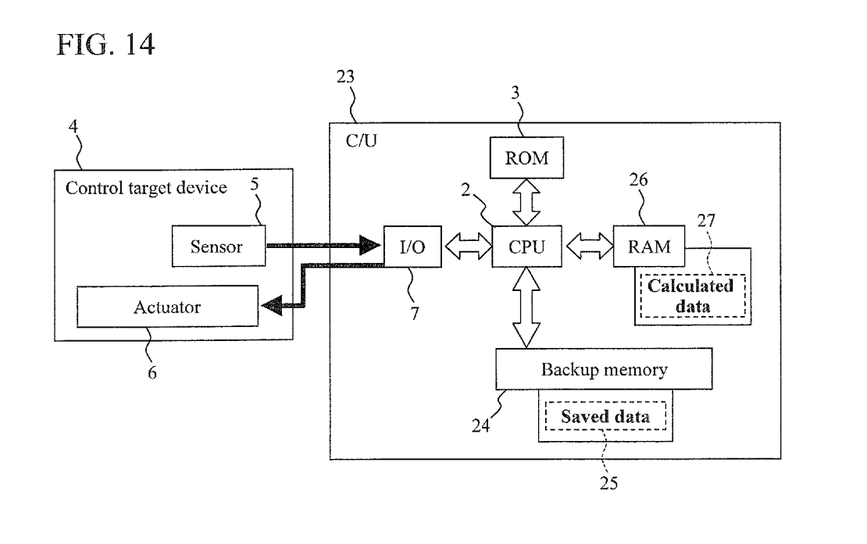
FIG. 14 is a block diagram showing the configuration of a second example of the embedded control system according to the present invention.

A second example of the embedded control system of the present invention will be described with reference to FIG. 14. The embedded control system in the example has the control unit (C/U) 1 provided with a microcomputer. The control unit (C/U) 1 has the central processing unit (CPU) 2, the read-only memory (ROM) 3, a random access memory (RAM) 26, a backup memory 24, and the input/output unit (I/O) 7. The map/table/axis data 8 is stored in the read-only memory 3. An input signal or data 27 calculated in the process of operation is temporarily stored in the random access memory (RAM) 26. However, the data 27 is deleted with power-off. Thus, saved data 25 that is identical to the data 27 is always stored in the backup memory 24. When power is turned on next time, the saved data 25 stored in the backup memory 24 is used.

The backup memory 24 may be a RAM always energized by a power supply or an erasable programmable read-only memory or a flash memory.

The data 27 stored in the random access memory (RAM) 26 is the 4-byte data 9 in the single-precision floating-point format. Thus, the data 9 is converted into the 2-byte data 10 in the significand-reduced floating-point format to be the saved data 25. In this manner, the 2-byte data 10 in the significand-reduced floating-point format is stored in the backup memory 24. When the saved data 25 stored in the backup memory 24 is read to perform an operation thereon, the data 10 is brought back to the data 9 in the single-precision floating-point format. The method of bringing back the data 10 to the 4-byte data 9 in the single-precision floating-point format is already described above. That is, the predetermined value 12 is substituted into 16 low-order bits of the significand. The flowchart at this point is shown in FIG. 15.

Figure 15:
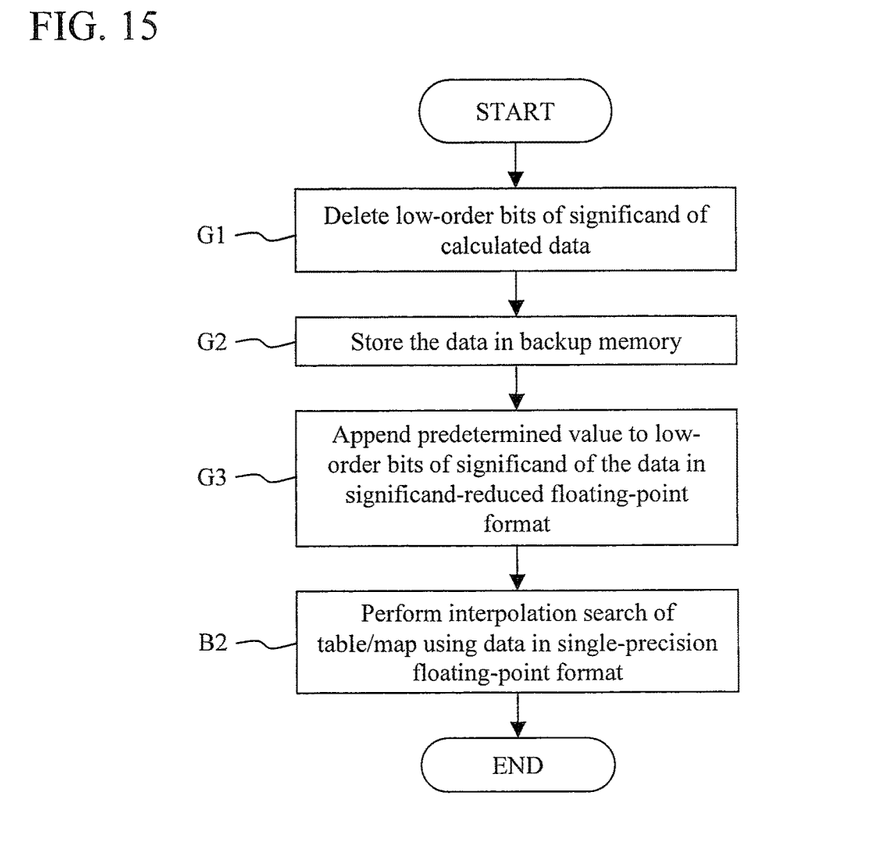
FIG. 15 is a diagram of flowchart illustrating processing for generating data in the single-precision floating-point format from data in the significand-reduced floating-point format stored in a backup memory and for performing an interpolation search of a table/map using the data in the second example of the embedded control system according to the present invention.

FIG. 15 will be described below. Low-order bits of the significand of the calculated data 27 in the single-precision floating-point format stored in the random access memory 26 are deleted at step G1. Data in the significand-reduced floating-point format is thereby obtained. Saved data 28 in the significand-reduced floating-point format is stored in the backup memory 24 at step G2. A predetermined value is appended to low-order bits of the significand of the saved data 28 stored in the backup memory 24 at step G3. The data 9 in the single-precision floating-point format is thereby restored. An interpolation search of the table/map is performed using the data 9 in the single-precision floating-point format at step B2.

If the saved data 25 in the single-precision floating-point format is 100-byte data, the data 10 in the significand-reduced floating-point format stored in the backup memory 24 becomes 50-byte data so that the storage capacity of 50 bytes can be reduced.

A case of conventional art, in which data in the fixed-point format is used, will be described with reference to FIG. 16. Offset data is subtracted from the calculated data 27 in the single-precision floating-point format stored in the random access memory 26 at step H1. The calculated data 27 after the subtraction is divided by LSB at step H2. The calculated data 27 after the subtraction and division is converted into data in the fixed-point format at step H3. The saved data 25 in the fixed-point format is stored in the backup memory 24 at step G2. The saved data 28 stored in the backup memory 24 is converted into data in the single-precision floating-point format at step C1. The data in the single-precision floating-point format is multiplied by the LSB data at step C2. The offset data is added to the data after the multiplication at step C3. An interpolation search of the table/map is performed using the data 9 in the single-precision floating-point format at step B2.

Figure 16:
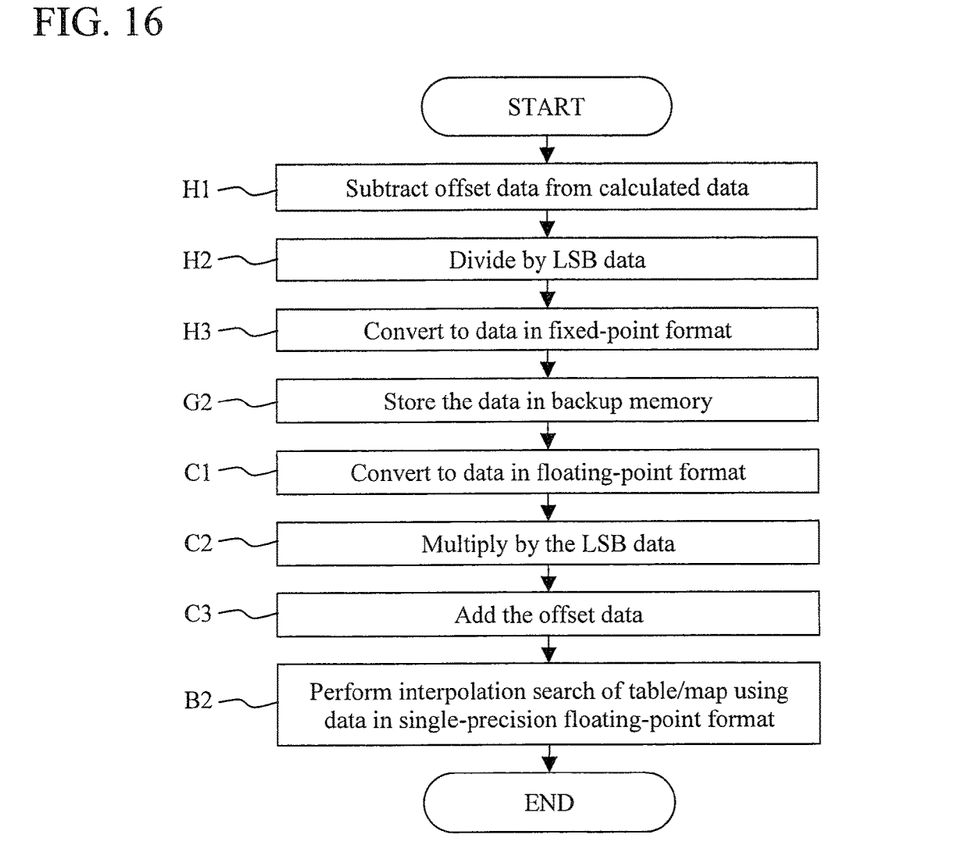
FIG. 16 is a diagram of flowchart illustrating processing for generating data in the single-precision floating-point format from data in the fixed-point format stored in the backup memory and for performing an interpolation search of a table/map using the data by conventional technology.

The conventional technology shown in FIG. 16 needs three steps of step H1, step H2, and step H3 before data is stored in the backup memory 24. According to the present invention shown in FIG. 15, on the other hand, only one step of step G1 is needed. Thus, a computational load can be reduced. The conventional technology shown in FIG. 16 also needs three steps of step C1, step C2, and step C3 before an interpolation search of the table/map being performed using saved data stored in the backup memory 24. According to the present invention, on the other hand, only one step of step G3 is needed. Therefore, a computational load can be reduced.

Another example of data in the significand-reduced floating-point format according to the present invention will be described with reference to FIG. 17. The data 28 in the significand-reduced floating-point format of the example is data of a total of 2 bytes consisting of the identification bit (1 bit)+the sign bit (1 bit)+the exponent part (8 bits)+high-order bits (6 bits) of the significand. The data 28 in the significand-reduced floating-point format of the example is obtained by both appending the identification bit (1 bit) to the head of the 4-byte data 9 in the single-precision floating-point format shown in FIG. 2 and deleting 16 low-order bits of the significand.

The data 29 in the significand-reduced floating-point format of the example is data of a total of 3 bytes consisting of the identification bit (1 bit)+the sign bit (1 bit)+the exponent part (8 bits)+high-order bits (14 bits) of the significand. The data 29 in the significand-reduced floating-point format of the example is obtained by both appending the identification bit (1 bit) to the head of the 4-byte data 9 in the single-precision floating-point format shown in FIG. 2 and deleting 8 low-order bits of the significand.

The identification bit (1 bit) shows the type of data in the significand-reduced floating-point format, that is, the number of bytes. If, for example, the value of an identification bit 30 is "0", the 2-byte data 28 in the significand-reduced floating-point format is indicated, and if the value of the identification bit 30 is "1", the 3-byte data 29 in the significand-reduced floating-point format is indicated. By reading the value of the identification bit 30 at the head of data, the central processing unit 2 can know whether data is 2-byte data in the significand-reduced floating-point format or 3-byte data in the significand-reduced floating-point format.

Figure 17:
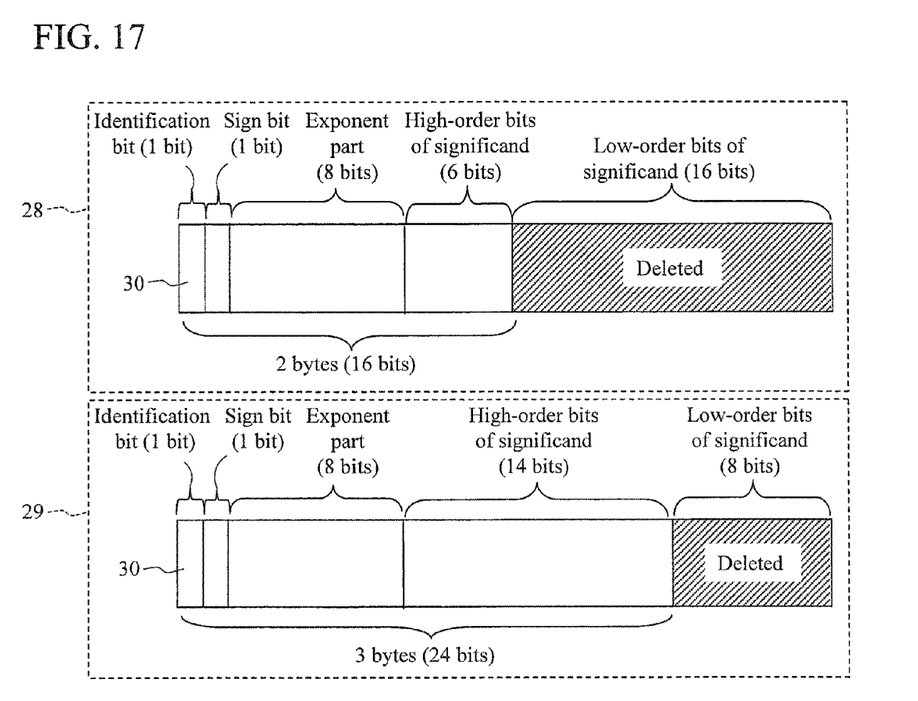
FIG. 17 is a diagram showing further another example of data in the significand-reduced floating-point format according to the present invention.

The map/table/axis data 8 contains two types of the data 28 and 29 in the significand-reduced floating-point format shown in FIG. 17.

The 2-byte data 28 in the significand-reduced floating-point format can reduce the storage capacity of the read-only memory 3 since the amount of data thereof is relatively small. However, accuracy of arithmetic using the data 28 is relatively low. The 3-byte data 29 in the significand-reduced floating-point format, on the other hand, cannot reduce the storage capacity of the read-only memory 3 since the amount of data thereof is relatively large. However, accuracy of arithmetic using the data 29 is relatively high.

Therefore, when higher priority should be given to reduction of the storage capacity of the read-only memory 3, the 2-byte data 28 in the significand-reduced floating-point format is used, and when higher priority should be given to arithmetic precision, the 3-byte data 29 in the significand-reduced floating-point format is used.

Figure 18:
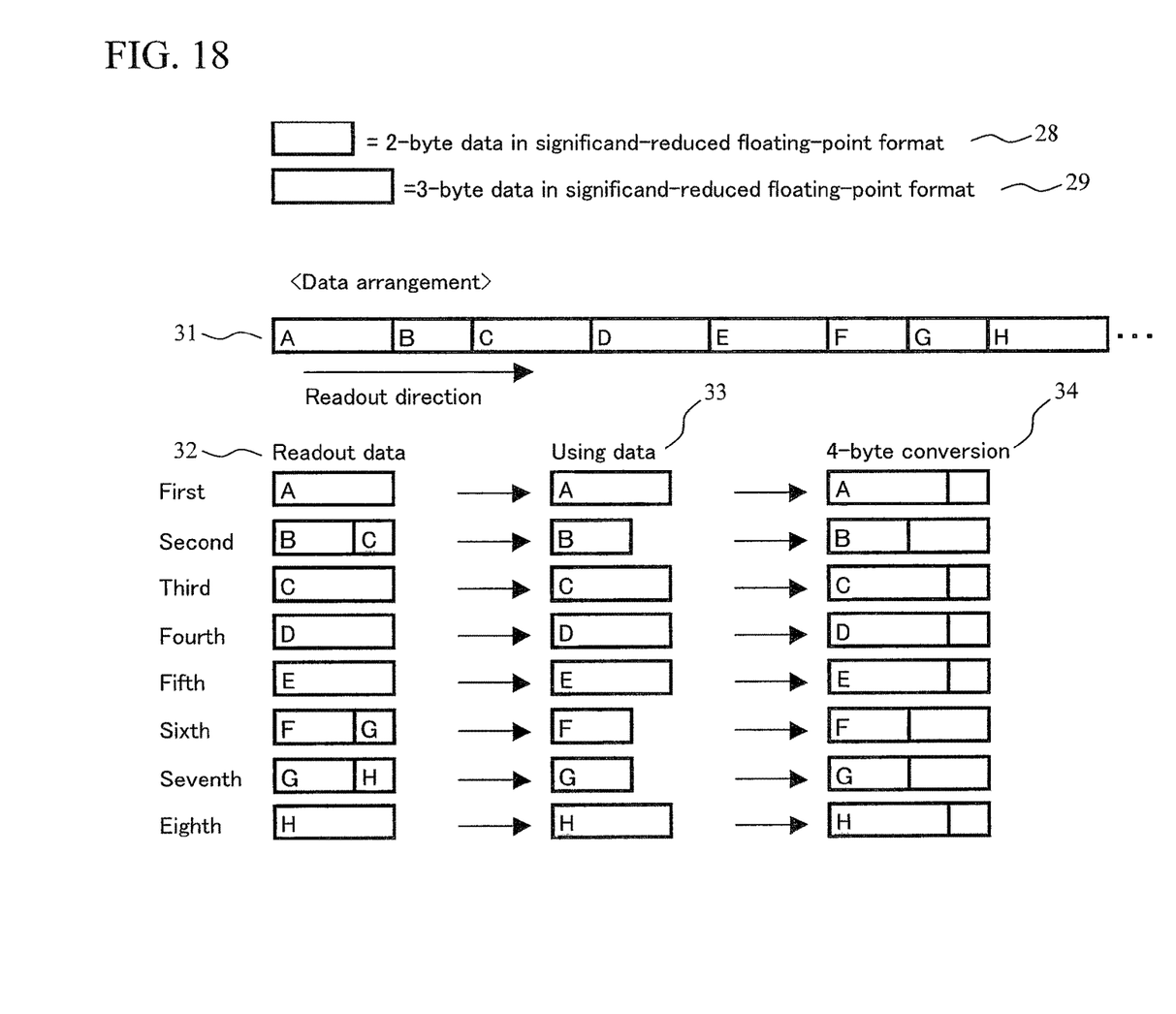
FIG. 18 is a diagram illustrating a method of reading a plurality of pieces of data in the significand-reduced floating-point format having different numbers of bytes by a sequential access method in the embedded control system according to the present invention.

A method of reading data stored in the read-only memory 3 by the sequential access method will be described with reference to FIG. 18. As shown in FIG. 18, the read-only memory 3 has the map/table/axis data 8 including two types of data of the data 28 and 29 in the significand-reduced floating-point format stored therein. According to a data array 31, the 2-byte data 28 in the significand-reduced floating-point format and the 3-byte data 29 in the significand-reduced floating-point format are arranged in random order. The central processing unit 2 reads data in units of 3 bytes from the head of the data array 31. In the first readout, the central processing unit 2 reads 3-byte data. The central processing unit 2 reads the identification bit at the head of the 3 bytes and determines that the read data is the 3-byte data 29 in the significand-reduced floating-point format. This will be first data to be used 33. The data to be used 33 consists of the 3-byte data 29 in the significand-reduced floating-point format. A predetermined value of 8 low-order bits is appended to the 3-byte data to be used. 4-byte data is obtained by this 4-byte conversion 34.

In the second readout, the central processing unit 2 reads 3-byte data. The central processing unit 2 reads the identification bit of the 3 bytes and identifies that the read data is the 2-byte data 28 in the significand-reduced floating-point format. Therefore, the central processing unit 2 determines that the read 3-byte data contains, in addition to the 2-byte data 28 in the significand-reduced floating-point format, 1-byte unnecessary data. Thus, 1-byte data at the back of the read 3-byte data is deleted. This will be the second data to be used 33. The data to be used 33 consists of the 2-byte data 28 in the significand-reduced floating-point format. A predetermined value of 16 low-order bits is appended to the 2-byte data to be used. 4-byte data is obtained by the 4-byte conversion 34.

Figure 19:
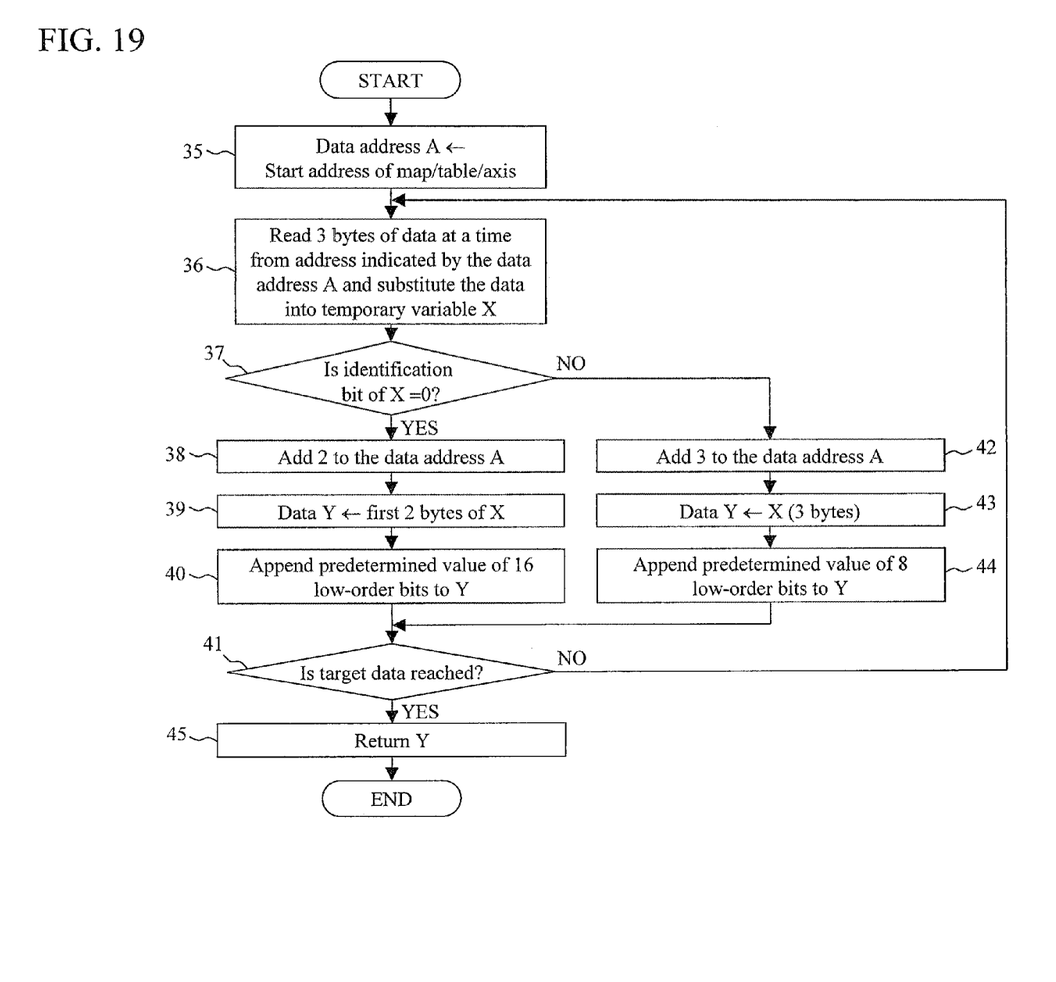
FIG. 19 is a diagram of flowchart illustrating the method of reading a plurality of pieces of data in the significand-reduced floating-point format having different numbers of bytes by the sequential access method in the embedded control system according to the present invention.

The method of reading data stored in the read-only memory 3 by the sequential access method will be described in detail with reference to FIG. 19. Initialization processing is performed at step 35. That is, the start address of map/table/axis data is substituted into a data address A. 3-byte data from the address indicated by the data address A is read at step 36 to substitute the data into a temporary variable X. This corresponds to read data 32 in FIG. 18.

The identification bit 30 is read from data contained in the temporary variable X at step 37. If the identification bit 30 is "0", processing proceeds to step 38. That is, the read data is the 2-byte data 28 in the significand-reduced floating-point format. If the identification bit 30 is "1", processing proceeds to step 42. That is, the read data is the 3-byte data 29 in the significand-reduced floating-point format.

Steps 38 to 40 correspond to processing when the read data is the 2-byte data 28 in the significand-reduced floating-point format. 2 is added to the data address A for the next readout processing at step 38. At step 39, first 2 bytes of 3-byte data X are substituted into data Y to be returned by the subroutine. This corresponds to the second data to be used 33 in FIG. 18. A predetermined value of 16 low-order bits is appended to the data Y at step 40. The data Y thereby becomes 4-byte data. This corresponds to the second 4-byte conversion 34.

Steps 42 to 44 correspond to processing when the read data is the 3-byte data 29 in the significand-reduced floating-point format. 3 is added to the data address A for the next readout processing at step 42. 3-byte data X is substituted into the data Y at step 43. This corresponds to the first data to be used 33 in FIG. 18. A predetermined value of 8 low-order bits is appended to the data Y at step 44. The data Y thereby becomes 4-byte data. This corresponds to the first 4-byte conversion 34.

A loop counter is referenced at step 41 in order to determine whether or not the current data is the target data. If the current data is the target data, processing proceeds to step 45 to set the data Y as the return value before terminating the subroutine. If it is determined at step 41 that the target data has not been reached, processing returns to step 36 to repeat subsequent steps.

As shown in FIG. 17, by representing the map/table/axis data 8 by two types of data in the significand-reduced floating-point format, it becomes possible to use two types of data in the significand-reduced floating-point format. If higher priority should be given to reduction of the storage capacity of the read-only memory 3, only the data 28 in the significand-reduced floating-point format is used or mainly the data 28 in the significand-reduced floating-point format is used. If higher priority should be given to arithmetic precision, only the 3-byte data 29 in the significand-reduced floating-point format is used or mainly the 3-byte data 29 in the significand-reduced floating-point format is used.

Here, an example using two types of data of the 2-byte data 28 in the significand-reduced floating-point format and the 3-byte data 29 in the significand-reduced floating-point format is described. However, three types or more of data in the significand-reduced floating-point format may be used. In that case, the identification bit 30 will at least have 2 bits.

In the example in FIG. 17, the identification bit 30 is appended to the first bit of data in the significand-reduced floating-point format. However, the identification bit 30 may be appended to anywhere of data in the significand-reduced floating-point format. In the example in FIG. 18, the central processing unit 2 reads data in units of 3 bytes from the head of the data array 31. Therefore, the identification bit 30 needs only to be included in the 3 bytes from the head of the read data. However, as the example in FIG. 17, the identification bit 30 is preferably appended to the head of data in the significand-reduced floating-point format. In this case, the type of data can be identified by reading only the first 1 byte. Processing can thereby be made faster.

Examples of the present invention have been described above, but the present invention is not limited to the examples and those skilled in the art will readily understand that various modifications can be made within the scope of the present invention defined by the appended claims.

What is claimed is:

1. An embedded control system provided with a microcomputer having a memory for storing data in a floating-point format and a central processing unit for performing arithmetic operations on the data in the floating-point format, wherein the central processing unit converts discrete data in the floating-point format into discrete data in a significand-reduced floating-point format in which low-order bits of the significand of the discrete data in the floating-point format are deleted before the discrete data in the significand-reduced floating-point format is stored in the memory, and the central processing unit performs an interpolation search on the discrete data in the floating- point format after the discrete data in the significand-reduced floating-point format is temporarily converted into the discrete data in the floating-point format in another memory while maintaining the discrete data in the significand-reduced floating-point format in the memory, and wherein the discrete data in the floating-point format is 4-byte data including a 1-bit sign bit, an 8-bit exponent part, and the 23-bit significand, and the discrete data in the significand-reduced floating-point format is 2-byte data including the 1-bit sign bit, the 8-bit exponent part, and the 16-bit significand and is obtained by deleting 16 low-order bits of the significand of the data in the floating-point format.

2. The embedded control system according to claim 1, wherein the central processing unit appends a predetermined value to the deleted low-order bits of the significand when the discrete data in the significand-reduced floating-point format is converted into the discrete data in the floating-point format.

3. The embedded control system according to claim 2, wherein the predetermined value is 0.

4. The embedded control system according to claim 2, wherein the predetermined value is a value substantially half of a maximum value of the predetermined value.

5. The embedded control system according to claim 1, wherein when the central processing unit converts the discrete data in the floating-point format into the discrete data in the significand-reduced floating-point format, if a highest-order bit of the deleted low-order bits of the data in the floating-point format is "1", the central processing unit adds 1 to high-order bits of the significand of the data in the significand-reduced floating-point format.

6. The embedded control system according to claim 1, wherein the discrete data in the significand-reduced floating-point format includes an identification bit indicating a number of bytes of the discrete data in the significand-reduced floating-point format.

7. The embedded control system according to claim 6, wherein the identification bit is arranged at the head of the discrete data in the significand-reduced floating-point format.

8. The embedded control system according to claim 1, wherein the discrete data in the floating-point format is 4-byte data including a 1-bit sign bit, an 8-bit exponent part, and the 23-bit significand and the discrete data in the significand-reduced floating-point format is 2-byte data including a 1-bit identification bit, the 1-bit sign bit, the 8-bit exponent part, and the 6-bit significand and is obtained by deleting 16 low-order bits of the significand of the data in the floating-point format.

9. The embedded control system according to claim 1, wherein the discrete data in the floating-point format is 4-byte data including a 1-bit sign bit, an 8-bit exponent part, and the 23-bit significand and the discrete data in the significand-reduced floating-point format is 3-byte data including a 1-bit identification bit, the 1-bit sign bit, the 8-bit exponent part, and the 14-bit significand and is obtained by deleting 8 low-order bits of the significand of the data in the floating-point format.

10. The embedded control system according to claim 1, further comprising a random access memory for temporarily storing data in the floating-point format and a backup memory for storing saved data identical to data temporarily stored in the random access memory, wherein when the central processing unit stores data in the floating-point format stored in the random access memory in the backup memory, the central processing unit converts the data in the floating-point format into the data in the significand-reduced floating-point format before the data being stored.

11. The embedded control system according to claim 1, wherein the discrete data represents controlled values of monitored parameters of a vehicle; and the central processing unit produces a controlled value for a controlled component of the vehicle by performing the interpolation search and outputs the controlled value to the controlled component.

* * * * *